…

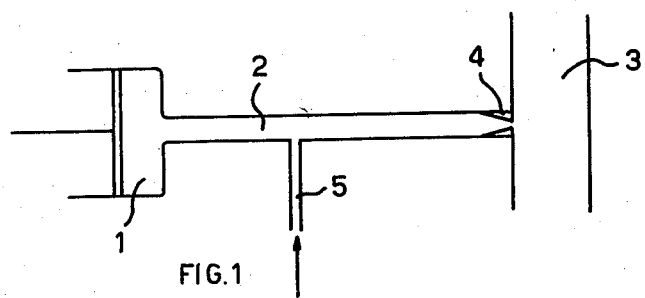
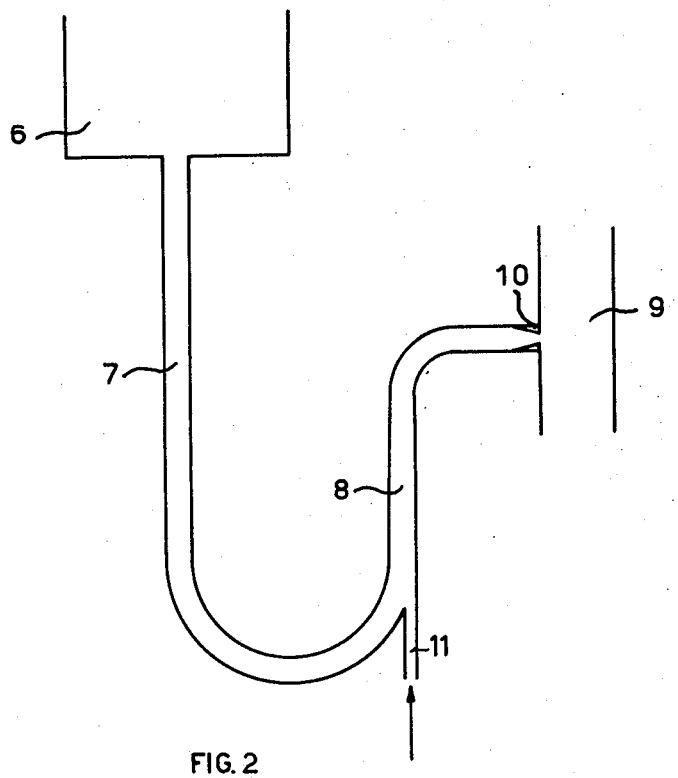

United States Patent Office 3,152,117
Patented Oct. 6, 1964

3,152,117
PROCESS FOR FEEDING A LIQUID INTO A TURBULENT SECOND LIQUID
Pieter Eijsberg, Stein, Renier J. L. Graff, Beek, and Leonardus Mullers, Stein, Netherlands, assignors to Stamicarbon N.V.
Filed May 26, 1961, Ser. No. 112,780
Claims priority, application Netherlands, Nov. 27, 1957, 222,793
9 Claims. (Cl. 260—239.3)

The present invention relates to a novel process for feeding a liquid into a turbulent second liquid. More particularly, the invention is concerned with a novel process for introducing a liquid into a turbulent second liquid through a feed pipe opening into the second liquid whereby possibly undesirable reactions between the first liquid and any of the second liquid which may enter the feed pipe, are avoided.

In some technological processes in which a continuous body or stream of liquid is introduced into a turbulent second liquid through a feed pipe opening into the second liquid, the difficulty is encountered that the second liquid may back up into the feed pipe and, when entering the feed pipe, may produce an undesirable reaction with the first liquid. Undesirable reaction as meant here may consist, for example, in the formation of crystal deposits in the feed pipe. It is also possible that the reaction between the second liquid entering the feed pipe and the first liquid will be undesirably violent due to the fact that in the feed pipe mixing is less rapid than in the turbulent second liquid. As a result, it is difficult to control the process satisfactorily and in some cases explosion hazards may exist.

An example of an undesirable reaction of the above-mentioned type is met with in the preparation of adipic acid by oxidation of cyclohexanol or cyclohexanone by means of nitric acid. The stream of cyclohexanol is passed through a feed pipe opening into a solution of adipic acid containing nitric acid, which is kept in turbulent motion. In this process, violent reactions may occur in the feed pipe. Such reactions may propagate rather rapidly through the feed pipe in the direction of the cyclohexanol storage tank and thus may cause serious explosion hazards.

After detailed investigation, it has been found that the above-mentioned violent reactions are in most cases associated with the presence of a gas bubble in the feed pipe. This has been established by creating a gas bubble in the feed pipe by connecting same to a vessel containing air. In this way, violent reactions have been produced on a small-scale and it has been found that they occur every time pressure fluctuations take place in the turbulent adipic acid solution containing nitric acid. It is believed the phenomenon may be explained as follows although it will be appreciated that the invention is not limited thereto:

through a feed pipe into a second liquid in the turbulent state. A more specific object is the provision of a novel way of obviating undesired and possibly violent reactions in systems of the type discussed above. It is a particular object of the invention to provide a novel way of avoiding undesired reactions in the preparation of adipic acid by oxidation of cyclohexanol or cyclohexanone despite pressure fluctuations or stoppage of the cyclohexanol or cyclohexanone feed. Other objects will also be apparent from the more detailed description of the invention which follows.

Broadly stated, the foregoing objects are realized, according to the invention, by modifying the above-described procedures for introducing one liquid through an inlet or feed pipe into a turbulent second liquid so as to include the step of passing an insert gas through the feed pipe and into the second liquid in conjunction with the first liquid. This procedure avoids entry of the second liquid into the feed pipe, either while the first liquid is flowing or when it has been stopped.

In a preferred mode of operation, a continuous body or stream or liquid moves through a feed pipe which is coupled into a pipe or vessel containing a turbulent body of a second liquid capable of undergoing an undesirable reaction with the first liquid, such as an explosion, by entering into the feed pipe, and a relatively slow stream of inert gas flows along with the liquid in the feed pipe. The flow of liquid in the feed pipe is maintained laminar or non-turbulent, and the slow speed of the inert gas stream permits the gas to flow along steadily in streamlines without inducing any turbulence.

The feed pipe is, desirably, necked down at its entry point into the pipe or vessel containing the turbulent body of liquid, since this tends to minimize the quantity of gas required to prevent entrance of the second liquid into the feed pipe.

The gas used may be any gaseous substance which does not, or at least not completely, dissolve in the first or the second liquid or produce an undesirable reaction with either liquid. In the above-mentioned preparation of adipic acid, for instance, use may be made of air. In the case of reactions producing froth, the amount of gas fed in preferably should not be made too large, as this would cause the production of an undue amount of froth.

A preferred embodiment of the present process is diagrammatically illustrated in the accompanying drawings.

Referring more particularly to FIGURE 1, a liquid, typically cyclohexanol, may be supplied by means of a displacement pump 1. The cyclohexanol next passes through a feed pipe 2 and into a conduit 3 which conveys a turbulent liquid containing nitric acid. At the end of the feed pipe 2 there is a nozzle 4. A gas, typically air, is supplied through conduit 5.

In the arrangement shown in FIGURE 2, the cyclohexanol or other liquid flows from a gravity feed tank 6 through a feed pipe 7. The latter includes a vertical taining nitric acid from entering the pipe, when the displacement pump was stopped; no reaction took place in the feed pipe. By contrast, when both the displacement pump and the air supply were stopped a violent reaction in the feed pipe enused within one minute.

The process according to the invention is not restricted to the leading of cyclohexanol into a liquid containing nitric acid, but may be used in many procedures. It has been found, for instance, that good results may be obtained also when liquid cyclohexanone oxime is led into a turbulent mixture of sulfuric acid and caprolactam. Thus, for example, nitrogen may be supplied together with the cyclohexanone oxime through a feed pipe opening into the mixture of acid and caprolactam. When the supply of oxime is stopped, no undesirable reaction between the oxime and the sulfuric acid occurs.

This is a continuation in part of U.S. application Serial No. 776,137, filed November 24, 1958, now abandoned.

Various modifications may be made in the invention described herein without deviating from the scope thereof as defined in the following claims wherein:

What is claimed is:

1. A method for avoiding undesired reactions of a continuous body of a first liquid while introducing said first liquid as a feed stream into a turbulent body of a second liquid, said liquids causing an undesirable reaction when the second liquid enters the first liquid feed stream, said method comprising feeding a stream of gas into the continuous body of said first liquid feed stream and feeding said stream of gas together with said first liquid toward the turbulent body of said second liquid, interrupting the flow of said first liquid while continuing the flow of gas at sufficient velocity to prevent entry of said second liquid into first liquid feed stream, said stream of gas being fed in streamline fashion and at a slower rate of feed than the feed rate of said first liquid to thereby avoid introducing any turbulence in said first liquid feed stream.

2. A method for avoiding undesired reactions of a first liquid in a feed pipe which leads into a vessel containing a turbulent body of a second liquid, said liquids causing an undesired reaction when the second liquid enters the feed pipe, said method comprising flowing a non-turbulent body of said first liquid through the feed pipe toward said vessel and introducing a relatively slow stream of inert gas into said feed pipe to flow steadily along with the non-turbulent body of said first liquid in streamline fashion without inducing any turbulence therein whereby said first liquid is introduced into said turbulent second liquid without the occurrence of undesirable reactions and said second liquid is prevented from entering said feed pipe.

3. A method as set forth in claim 2 including interrupting the flow of said first liquid in the feed pipe while continuing the flow of gas at sufficient velocity to prevent entry of said second liquid into the feed pipe.

4. A method as set forth in claim 2 in which said undesired reaction is an explosion.

5. A method as set forth in claim 2 in which said gas and first liquid are fed together through a nozzle into said second liquid.

6. In a process for the preparation of adipic acid by oxidation with nitric acid of a first liquid member selected from the group consisting of cyclohexanol and cyclohexanone, where said first liquid member is fed into a turbulent solution of adipic acid containing nitric acid, the method of avoiding undesired violent reactions while feeding said first liquid to said turbulent solution which comprises flowing said first liquid medium in the form of a non-turbulent feed toward the turbulent solution and introducing a relatively slow stream of inert gas into said first liquid medium in streamline fashion without introducing any turbulence therein whereby said first liquid medium is introduced into said turbulent solution without the occurence of undesirable violent reactions in said first liquid medium feed.

7. A method as set forth in claim 6 in which said gas is air.

8. In a process for reacting liquid cyclohexanone oxime with a mixture of sulfuric acid and caprolactam, wherein liquid cyclohexanone oxime is fed into a turbulent mixture of sulfuric acid and caprolactam, the method of avoiding undesired violent reactions while feeding liquid cyclohexanone oxime into said turbulent mixture which comprises flowing liquid cyclohexanone oxime in the form of a non-turbulent feed toward the turbulent mixture and introducing a relatively slow stream of inert gas into said cyclohexanone oxime in streamline fashion without introducing any turbulence therein whereby said cyclohexanone oxime is introduced into said turbulent mixture without the occurrence of undesirable violent reactions in said cyclohexanone oxime feed.

9. A method as set forth in claim 8 in which said gas is nitrogen.

References Cited in the file of this patent

UNITED STATES PATENTS

| | | |
|---|---|---|
| 449,687 | Maxim | Apr. 7, 1891 |
| 1,007,788 | Mills | Nov. 7, 1911 |
| 1,714,232 | Morris | May 21, 1929 |
| 1,959,815 | Corcoran | May 22, 1934 |
| 2,286,559 | McAllister | June 16, 1942 |
| 2,487,246 | Johnson et al. | Nov. 8, 1949 |
| 2,782,215 | Smith et al. | Feb. 19, 1957 |
| 2,958,333 | Poettmann et al. | Nov. 1, 1960 |

FOREIGN PATENTS

| | | |
|---|---|---|
| 205,993 | Australia | June 7, 1956 |
| 444,103 | Great Britain | Mar. 13, 1936 |